United States Patent
Sabev et al.

(10) Patent No.: US 10,015,049 B2
(45) Date of Patent: Jul. 3, 2018

(54) CONFIGURATION OF NETWORK DEVICES IN A NETWORK

(71) Applicant: SAP SE, Walldorf (DE)

(72) Inventors: Georgi Sabev, Sofia (BG); Bojidar Kadrev, Sofia (BG)

(73) Assignee: SAP SE, Walldorf (DE)

( * ) Notice: Subject to any disclaimer, the term of this patent is extended or adjusted under 35 U.S.C. 154(b) by 590 days.

(21) Appl. No.: 14/179,669

(22) Filed: Feb. 13, 2014

(65) Prior Publication Data

US 2015/0229526 A1    Aug. 13, 2015

(51) Int. Cl.
*H04L 12/24*    (2006.01)

(52) U.S. Cl.
CPC ...... *H04L 41/0869* (2013.01); *H04L 41/0846* (2013.01); *H04L 41/0863* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 6,704,752 B1 * | 3/2004 | Kathail et al. | |
| 7,272,653 B2 | 9/2007 | Levy-Abegnoli et al. | |
| 7,503,050 B2 | 3/2009 | Nenov et al. | |
| 7,735,097 B2 | 6/2010 | Kovachka-Dimitrova et al. | |
| 8,335,171 B1 * | 12/2012 | Purkayastha et al. | 370/254 |
| 8,527,622 B2 | 9/2013 | Souza et al. | |
| 8,566,524 B2 | 10/2013 | Heller et al. | |
| 8,868,701 B1 * | 10/2014 | Peters et al. | 709/221 |
| 8,966,039 B1 * | 2/2015 | Fultz et al. | 709/223 |
| 9,036,509 B1 * | 5/2015 | Addepalli et al. | 370/259 |
| 2002/0039353 A1 * | 4/2002 | Bienn et al. | 370/254 |
| 2003/0051049 A1 * | 3/2003 | Noy et al. | 709/238 |
| 2005/0144299 A1 * | 6/2005 | Blevins et al. | 709/230 |
| 2005/0222969 A1 * | 10/2005 | Yip et al. | 707/1 |
| 2007/0101192 A1 | 5/2007 | Kutan et al. | |
| 2010/0169284 A1 | 7/2010 | Walter et al. | |
| 2011/0231532 A1 * | 9/2011 | Nishimura et al. | 709/221 |
| 2012/0096112 A1 | 4/2012 | Kerth et al. | |
| 2012/0150796 A1 | 6/2012 | Martick | |
| 2012/0278815 A1 * | 11/2012 | Balko | 719/313 |
| 2012/0290706 A1 | 11/2012 | Lin et al. | |
| 2013/0085996 A1 | 4/2013 | Tian et al. | |
| 2013/0139164 A1 | 5/2013 | Balko | |
| 2013/0166703 A1 | 6/2013 | Hammer et al. | |

(Continued)

FOREIGN PATENT DOCUMENTS

WO    WO-2011140951 A1    11/2011

*Primary Examiner* — Hicham Foud
(74) *Attorney, Agent, or Firm* — Buckley, Maschoff & Talwalkar LLC

(57) ABSTRACT

Various embodiments of systems and methods to configure network devices in a network are described herein. In one aspect, upon determining an unsuccessful configuration of a first network device, configuring the first network device is retried for a predetermined number of times. Further, a configuration of a second network device is reverted when the configuration of the first network device is unsuccessful upon retrying for the predetermined number of times. Upon determining of a successful configuration of the first network device, the configuration of the first network device and the second network device is committed.

15 Claims, 4 Drawing Sheets

(56) References Cited

U.S. PATENT DOCUMENTS

2013/0254758 A1   9/2013  Walter et al.
2015/0066571 A1*  3/2015  Balko ........................ 705/7.26
2015/0149601 A1*  5/2015  Popeszku et al. ............ 370/254

* cited by examiner

CONFIGURATION OF NETWORK DEVICES IN A NETWORK

BACKGROUND

Network devices in a network include features or parameters, which needs to be configured periodically. Often, a group of similar network devices within the network may have to be uniformly reconfigured, or a group of newly installed network devices may have to be initially configured. For example, as part of "platform as a service" offering, which provides a computing platform and a solution stack as a service, a cluster of load balancers (example for network devices) may have to be consistently configured to meet business needs. The conventional configuring or modifying configuration of the network devices is performed separately on each network device and configuration statuses of the network devices are monitored. This could be a tedious and error prone task that may result in inconsistent configuration of network devices.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to configure network devices in a network are described herein. The network may include a number of network devices and may include wireless and/or wired communication mediums to enable network devices to communicate with one another. Network devices can be components used to connect computers or other electronic devices together so that they can share files or resources such as, but are not limited to load balancers.

According to one embodiment, network devices associated with a network are consistently configured. Network devices associated with the network are configured until configuration of a network device of the network devices is unsuccessful or until the network devices are configured. When configuration of the network device is unsuccessful, configuration of the network device is retried for a predetermined number of times. Further, configuration of the configured network devices may be reverted when configuring the network device is unsuccessful upon retrying for the predetermined number of times. Thereby ensuring consistency in the configuration of the network devices.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
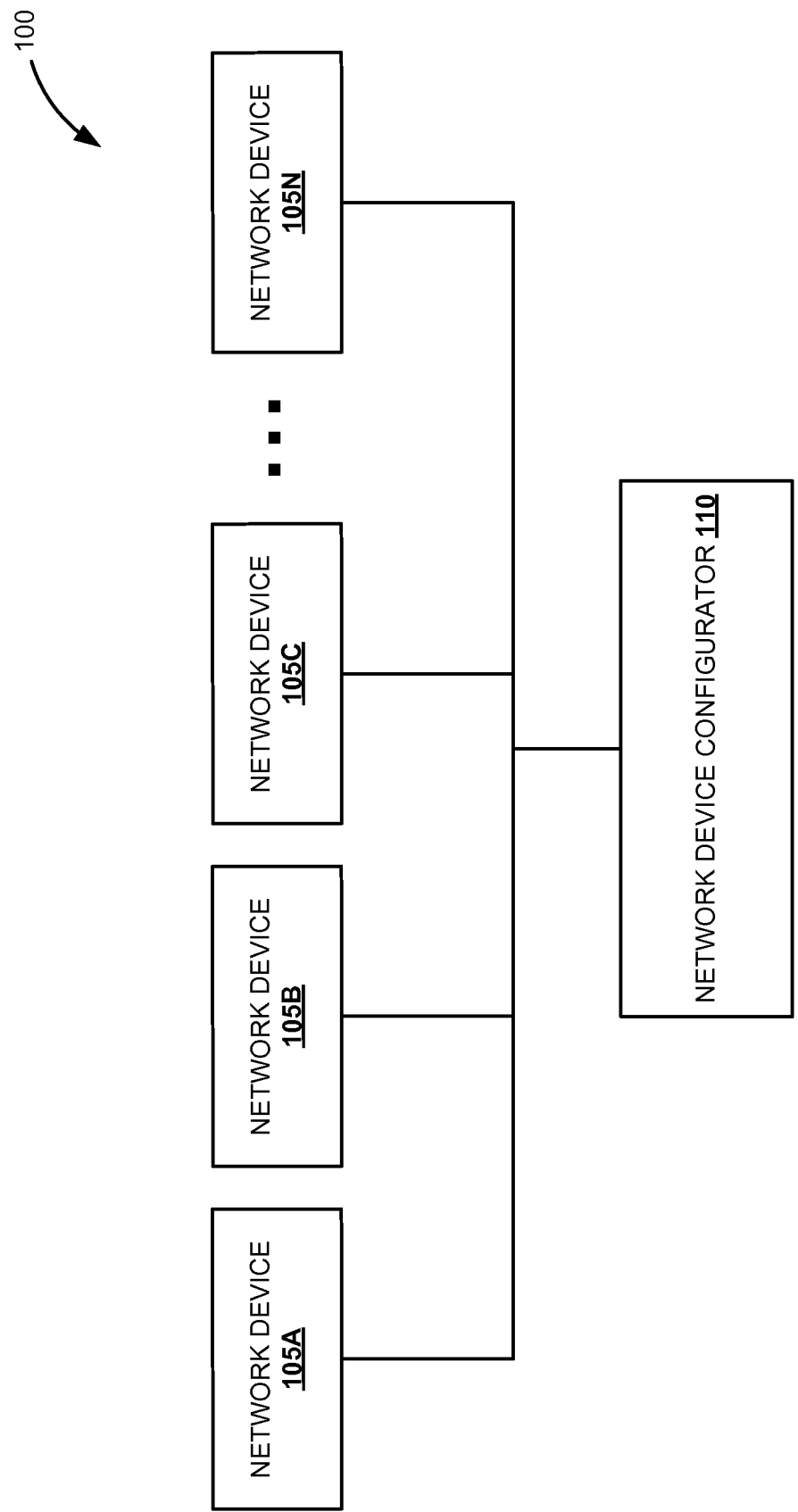
FIG. 1 is a block diagram of a network environment illustrating configuration of network devices, according to an embodiment.

FIG. 1 is a block diagram of network environment 100 illustrating configuration of network devices (e.g., 105A to 105N), according to an embodiment. The network environment 100 includes network device configurator 110 to configure the network devices (e.g., 105A to 105N). In one embodiment, the network devices (e.g., 105A to 105N) are sequentially configured by the network device configurator 110 until configuration of a network device is unsuccessful or the network devices in the network are configured.

For example, network device 105A is configured first and upon successful configuration of the network device 105A, network device 105B is configured and so on. Consider network device 105C is not successfully configured. Then, configuration of the network device 105C is retried for a predetermined number of times. The predetermined number of times can be defined by an administrator responsible for configuring the network devices.

When the configuration of the network device 105C is unsuccessful after the predetermined number of times, the configurations of the configured network devices (e.g., 105A and 105B) are reverted. When configuration of the network device 105C is successful within the predetermined number of times, sequential configuration of the network devices is proceeded to configure next network device in the network. Further, upon successful configuration of the network devices (e.g., 105A to 105N), the configurations of the network devices are committed by the network device configurator 110.

In one embodiment, the network device configurator 110 includes a middleware application programing interface (API) defining both configuration of the network devices and reverting configuration of the configured network devices when the configuration of a network device is unsuccessful. The middleware application programming interface can be defined as connectivity software which includes a set of enabling services that allow a number of network devices to interact across a network. Further, the API of network device configurator 110 communicates with the network devices (e.g., 105A to 105N) through node components associated with the network devices (e.g., 105A to 105N). Therefore, through sequential configuration of the network devices (e.g., 105A to 105N) and reverting the configuration of the configured network devices when the configuration of a network device is unsuccessful, the configurations of the network devices (e.g., 105A to 105N) are consistent. Thus, ensuring uniformity of the network devices (e.g., 105A to 105N).

Figure 2:
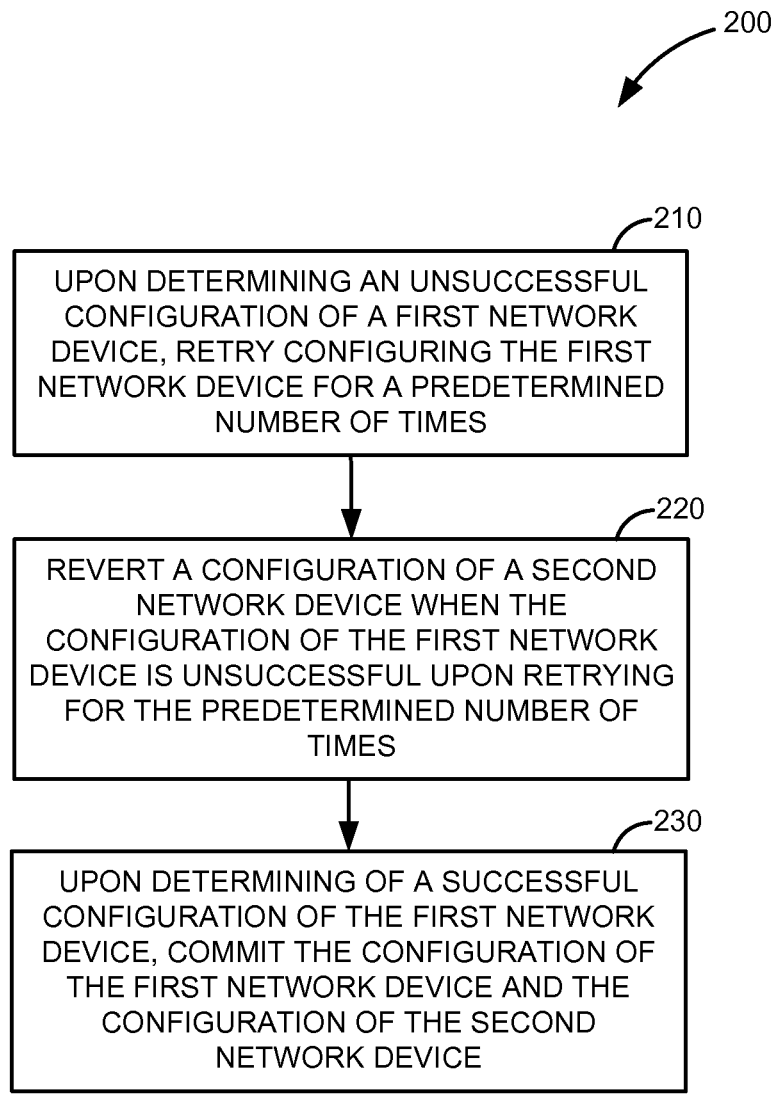
FIG. 2 is a flow diagram illustrating a process to configure network devices in a network, according to an embodiment.

FIG. 2 is a flow diagram illustrating process 200 to configure network devices in a network, according to an embodiment. Configuration of the network devices can be defined as configuring or modifying settings of the network devices for user applications, server processes and operating system. In one exemplary embodiment, load balancers in a cloud environment are considered as network devices to describe the process 200. Load balancing is a computer networking method for distributing workloads across computing resources such as, but are not limited to computers, network links, central processing units and disk drives. Further, consistency in configuration of a number of load balancers in the network may increase reliability of the network for executing multiple applications. However, the network devices can include other devices used to connect computers or other electronic devices together for sharing resources or providing security such as, but are not limited to, network address translation (NAT) devices, firewalls and servers.

Figure 3:
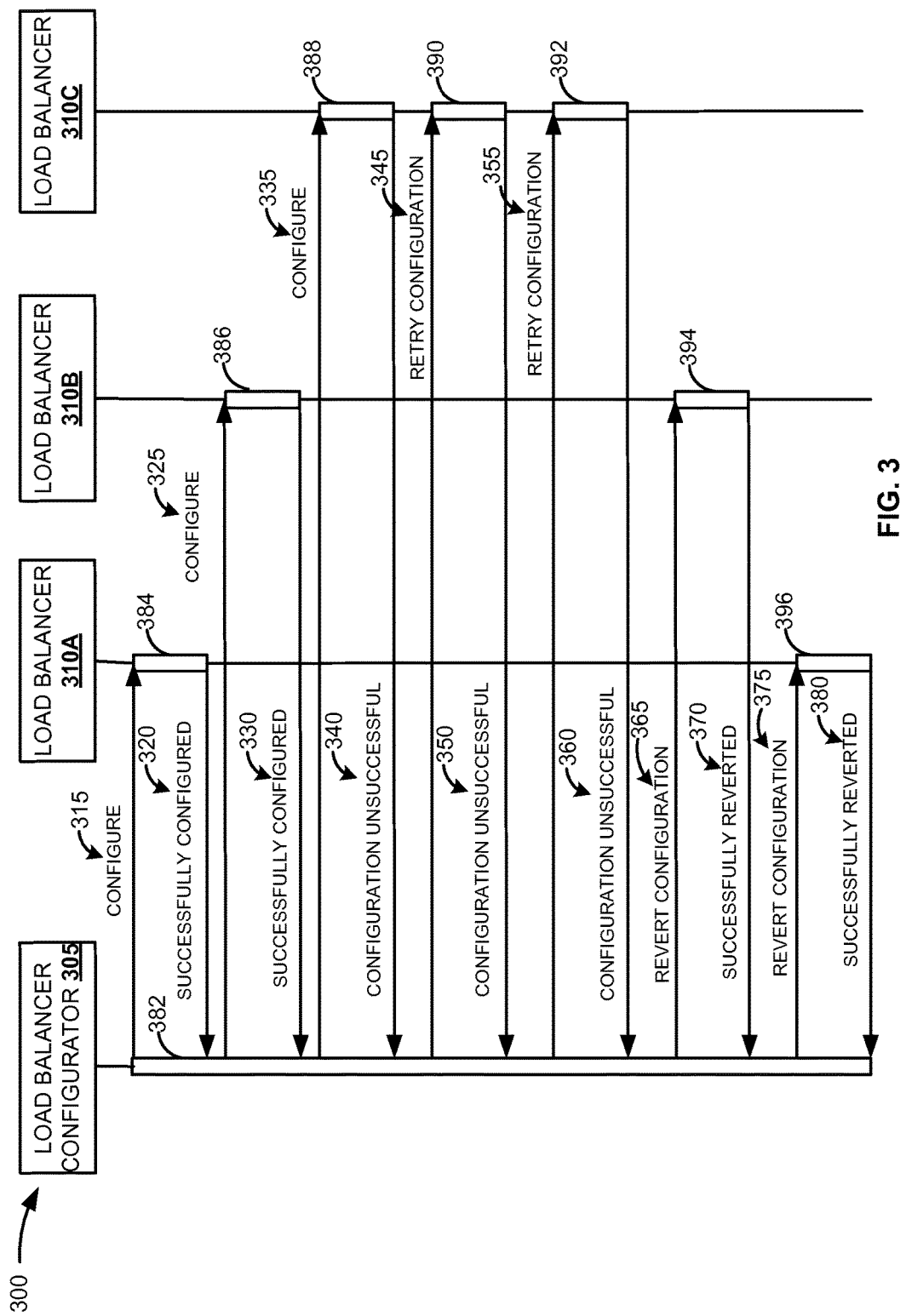
FIG. 3 is a sequence diagram illustrating an exemplary data flow between a load balancer configurator and load balancers in a network, according to an embodiment.

At 210 of FIG. 2, upon determining an unsuccessful configuration of a first network device, configuring the first network device is retried for a predetermined number of times. For example, FIG. 3 is a sequence diagram illustrating exemplary data flow 300 between load balancer configurator 305 and load balancers (e.g., 310A, 310B and 310C) in a network. The sequence diagram represents the interactions and the operations involved between the load balancer configurator 305 and the load balancers (e.g., 310A, 310B and 310C). The vertical lines of the load balancer configurator 305 and the load balancers (e.g., 310A, 310B and 310C) represent the processes that may exist simultaneously. The horizontal arrows (e.g., 315 to 380) represent the process steps between the vertical lines representing their respective process objects (e.g., the load balancer configurator 305 and the load balancers (e.g., 310A, 310B and 310C)). Activation boxes (e.g., 382 to 396) between the horizontal arrows represent the processes performed in the respective process object.

At 315, the load balancer configurator 305 sends configuration data to load balancer 310A for configuring the load balancer 310A. Upon receiving confirmation of successful configuration of the load balancer 310A (e.g., at 320), the load balancer configurator 305 sends the configuration data to load balancer 310B for configuring the load balancer 310B (e.g., at 325). The process of sequentially configuring the load balancers (e.g., 310A, 310B and 310C) continues until configuration of any load balancer is unsuccessful or the load balancers (e.g., 310A, 310B and 310C) are configured. For example at 330, the load balancer 310B is successfully configured. Further at 335, the load balancer configurator 305 sends the configuration data to load balancer 310C for configuring the load balancer 310C. At 340, a message indicating unsuccessful configuration of the load balancer 310C is received at the load balancer configurator 305.

As per step 210 of FIG. 2, the load balancer configurator 305 retries to configure the load balancer 310C of FIG. 3 for the predetermined number of times. Considering the predetermined number of times as two, the load balancer configurator 305 retries configuring the load balancer 310C twice (e.g., 345 to 360). However, the load balancer 310C was not configured after retrying for the predetermined number of times.

At 220 of FIG. 2, a configuration of a second network device is reverted when the configuration of the first network device is unsuccessful upon retrying for the predetermined number of times. The first network device and the second network device are associated with a network. Reverting configuration of the second network device can be referred as "rollback". For example, since configuration of load balancer 310C of FIG. 3 is unsuccessful, the configuration of the load balancer 310A and the load balancer 310B are reverted (e.g., 365 to 380).

At 230 of FIG. 2, upon determining of a successful configuration of the first network device, the configuration of the first network device and the second network device is committed. For example, when configuration of the load balancer 310C is successful within the predetermined number of times, the configurations of the load balancer 310A, the load balancer 310B and the load balancer 310C are committed.

In one embodiment, the load balancer configurator or the network device configurator defines reversible operations, which include both committing and rolling back configuration of the network devices. Thus, configurations of the load balancers (e.g., 310A, 310B and 310C) are maintained consistent.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
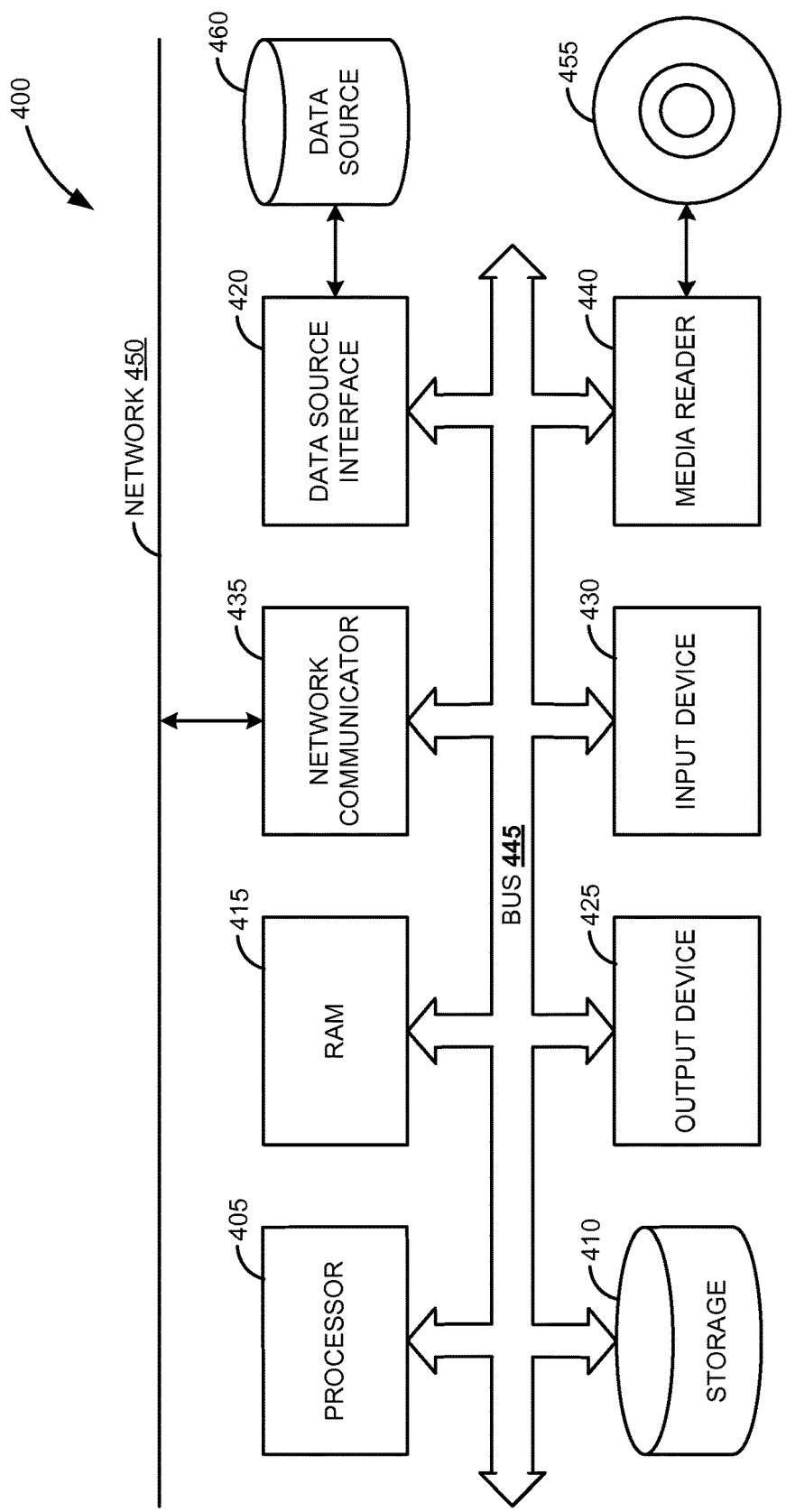
FIG. 4 is a block diagram of an exemplary computer system, according to an embodiment.

FIG. 4 is a block diagram of an exemplary computer system 400. The computer system 400 includes a processor 405 that executes software instructions or code stored on a computer readable storage medium 455 to perform the above-illustrated methods. The processor 405 can include a plurality of cores. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. According to some embodiments, such as some in-memory computing system embodiments, the RAM 415 can have sufficient storage capacity to store much of the data required for processing in the RAM 415 instead of in the storage 410. In some embodiments, all of the data required for processing may be stored in the RAM 415. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

The claims are as follows:

1. A non-transitory computer-readable medium storing instructions, which when executed by a computer cause the computer to perform operations comprising:
   sequentially configure network devices by a network device configurator;
   upon determining an unsuccessful configuration of a network device of the network devices, retry configuring the network device for a predetermined number of times;
   revert configuration of one or more configured network devices of the network devices when the configuration of the network device is unsuccessful upon retrying for the predetermined number of times;
   upon determining of a successful configuration of the network device, sequentially configure remaining network devices of the network devices until the network devices are configured; and
   upon determining of successful configuration of the network devices, commit the configuration of the configured network devices.

2. The non-transitory computer-readable medium of claim 1, wherein the network devices are associated with a network and comprise services to interact across the network.

3. The non-transitory computer-readable medium of claim 1, wherein the configuration of the network devices comprises modifying settings of the network devices for user applications, server processes and operating system.

4. The non-transitory computer-readable medium of claim 1, wherein the network device configurator comprises a middleware application programing interface defining configuration of the network devices and reverting configuration of the configured network devices.

5. The non-transitory computer-readable medium of claim 1, wherein the network devices comprise devices to connect electronic devices for sharing resources.

6. A computer implemented method to configure network devices in a network, the method comprising:
   sequentially configuring the network devices by a network device configurator;
   upon determining an unsuccessful configuration of a network device of the network devices, retry configuring the network device for a predetermined number of times;
   reverting configuration of one or more configured network devices of the network devices when the configuration of the network device is unsuccessful upon retrying for the predetermined number of times;
   upon determining of a successful configuration of the network device, sequentially configuring remaining network devices of the network devices until the network devices are configured; and upon determining of successful configuration of the network devices, committing the configuration of the configured network devices.

7. The computer implemented method of claim 6, wherein the network devices are associated with the network and comprise services to interact across the network.

8. The computer implemented method of claim 6, wherein the configuration of the network devices comprises modifying settings of the network devices for user applications, server processes and operating system.

9. The computer implemented method of claim 6, wherein the network device configurator comprises a middleware application programing interface defining configuration of the network devices and reverting configuration of the configured network devices.

10. The computer implemented method of claim 6, wherein the network devices comprise devices to connect electronic devices for sharing resources.

11. A computer system to configure network devices in a network, the computer system comprising:

at least one processor; and one or more memory devices communicative with the at least one processor, wherein the one or more memory devices store instructions to:

sequentially configure the network devices by a network device configurator;

upon determining an unsuccessful configuration of a network device of the network devices, retry configuring the network device for a predetermined number of times;

revert configuration of one or more configured network devices of the network devices when the configuration of the network device is unsuccessful upon retrying for the predetermined number of times;

upon determining of a successful configuration of the network device, sequentially configuring remaining network devices of the network devices until the network devices are configured; and upon determining of successful configuration of the network devices, commit the configuration of the configured network devices.

12. The computer system of claim 11, wherein the network devices are associated with the network and comprise services to interact across the network.

13. The computer system of claim 11, wherein the configuration of the network devices comprises modifying settings of the network devices for user applications, server processes and operating system.

14. The computer system of claim 11, wherein the network device configurator comprises a middleware application programing interface defining configuration of the network devices and reverting configuration of the configured network devices.

15. The computer system of claim 11, wherein the network devices comprise devices to connect electronic devices for sharing resources.

* * * * *